United States Patent
Carter (12)

(10) Patent No.: US 6,497,022 B1
(45) Date of Patent: Dec. 24, 2002

(54) PIPE END BURNISHING TOOL WITH FLOATING SURFACES TECHNICAL FIELD

(76) Inventor: Sam W. Carter, 4170 Indian Hills Trail, West Branch, MI (US) 48661

( * ) Notice: Subject to any disclaimer, the term of this patent is extended or adjusted under 35 U.S.C. 154(b) by 0 days.

(21) Appl. No.: 09/858,041

(22) Filed: May 15, 2001

(51) Int. Cl.⁷ ................................................ B24B 39/00
(52) U.S. Cl. ........................................ 29/90.01; 451/51
(58) Field of Search ............................. 29/90.01, 34 R, 29/90.3; 72/112, 479; 451/51, 440, 465, 484, 486; 7/157

(56) References Cited

U.S. PATENT DOCUMENTS

| | | |
|---|---|---|
| 505,960 A | 10/1893 | Scholz |
| 2,188,584 A | 1/1940 | Tyne |
| 2,188,624 A | 1/1940 | Dantry et al. |
| 2,645,000 A | 7/1953 | Finch |
| 2,748,631 A | 6/1956 | Neale |
| 2,812,624 A | 11/1957 | Billeter |
| 2,838,773 A | 6/1958 | Muse |
| 2,838,828 A | 6/1958 | Nordstrom |
| 2,855,811 A | 10/1958 | Fried |
| 3,162,893 A | 12/1964 | Townsend |
| 3,568,376 A | 3/1971 | Slater |
| 3,763,510 A | 10/1973 | Graham |
| 3,818,559 A | 6/1974 | Benson |
| 3,840,957 A | 10/1974 | Koppelmann |
| 3,870,432 A | 3/1975 | Strybel |
| 3,976,388 A | 8/1976 | Webb |
| 4,033,163 A | 7/1977 | Duffey et al. |
| 4,076,446 A | 2/1978 | Lindstaedt |
| 4,220,060 A * | 9/1980 | Bjodstrup ................... 82/113 |
| 4,246,728 A | 1/1981 | Leasher |
| 4,440,182 A * | 4/1984 | Holm ........................ 132/75.6 |
| 4,468,829 A | 9/1984 | Christensen |
| 4,955,165 A | 9/1990 | Brooks et al. |
| 5,004,383 A | 4/1991 | Elliott, Jr. |
| 5,038,525 A | 8/1991 | Gardner |
| 5,056,265 A | 10/1991 | Hurst |
| 5,058,327 A | 10/1991 | Buchanan |
| 5,168,660 A | 12/1992 | Smith |
| 5,180,260 A | 1/1993 | Phillips, Sr. |
| 5,269,104 A | 12/1993 | DiBiagio |
| 5,307,534 A | 5/1994 | Miller |
| D347,523 S | 6/1994 | Villeneuve |
| 5,464,364 A * | 11/1995 | Roitner ........................ 451/51 |
| 5,613,896 A | 3/1997 | Haus et al. |
| 6,012,973 A * | 1/2000 | Nagel .......................... 451/51 |
| 6,074,282 A * | 6/2000 | Schimweg .................... 451/51 |
| 6,101,696 A | 8/2000 | Carter |
| 6,106,370 A | 8/2000 | Carter |

* cited by examiner

*Primary Examiner*—Gregory M. Vidovich
*Assistant Examiner*—Marc Jimenez
(74) *Attorney, Agent, or Firm*—Reising, Ethington, Barnes, Kisselle, Learman & McCulloch, PC

(57) ABSTRACT

The pipe end burnishing tool has a tool shank with an axis of rotation, a first end adapted to be clamped to drill chuck, a second end, and a stop surface on the second end. A cup member is driven by the tool shank and axially moveable along the axis of rotation. An inside member is also driven by the shank and axially movable along the axis of rotation. A cup spring urges the cup toward the stop surface. An inside member spring urges the inside member away from the first end and also urges the cup member toward the first end. Conical burnishing surfaces on the cup and the inside member cooperate to burnish pipe ends. These burnishing surfaces float in line with the ends of pipes.

18 Claims, 3 Drawing Sheets

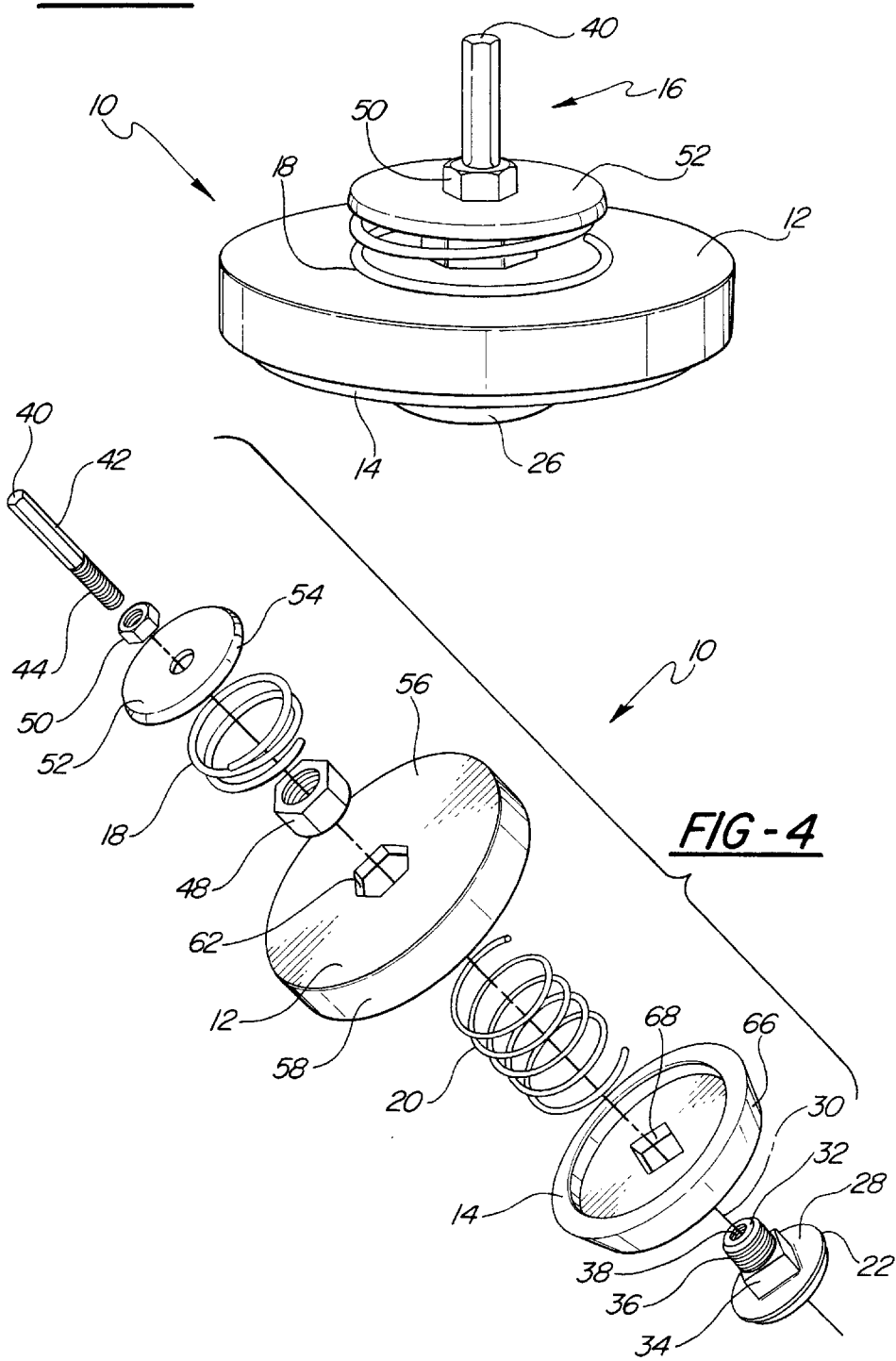

PIPE END BURNISHING TOOL WITH FLOATING SURFACES TECHNICAL FIELD

TECHNICAL FIELD

This invention relates to a pipe end burnishing tool and more particularly to a burnishing tool having inside and outside conical burnishing surfaces that float axially on a shank driven by a hand drill while burnishing a pipe end.

BACKGROUND OF THE INVENTION

Burnishing tools, such as the tool disclosed in my U.S. Pat. No. 6,101,696, are used to removed burrs and sharp edges from the cut ends of pipes. These burrs and sharp edges are removed from the outside surfaces of pipe ends to facilitate the attachment of couplings to pipe ends. Burrs and sharp edges are removed from inside surfaces of pipe ends to ensure free flow of liquids and gases through pipes. Burrs and sharp edges are also removed from the inside surfaces of conduit pipe ends to prevent damage to the insulation on wires that are to be pulled through the conduits.

Burnishing tools, for pipes that are less than 2 inches in diameter, work well when one burnishing surface is fixed relative to a tool shank and the other burnishing surface is axially movable relative to the shank. When burnishing the ends of pipes with a diameter of 2 inches or more, there is a tendency for the pipe to become locked between the inside conical burnishing surface and the outside conical burnishing surface. A pipe, that is locked between two burnishing surfaces, rotates with the shank when the shank is rotated by an electric drill and burrs and sharp surfaces are not removed.

The surfaces that are burnished on the ends of pipes with a diameter of two inches or more, when using a burnishing tool that has one conical burnishing surface fixed relative to the tool shank, become elliptical if the tool shank is not coaxial with the pipe. When using a hand drill, coaxial alignment between the tool shank and the pipe is nearly impossible to maintain. Elliptical burnished surfaces tend to produce two areas that are not adequately shaped and two areas that have too much material removed and are therefor too thin. Both areas that are too thin are potentially weak and could fail. An elliptical outer surface on a pipe end may also result in a weak connection between the pipe and a coupling. If the coupling is threaded, the depth of threads will vary and the joint will be weakened. If the coupling is soldered, there may be excess solder in some areas of the joint and insufficient solder in other areas. Either excess solder or insufficient solder between a pipe surface and a coupling surface can result in a weak joint.

Alignment between the axis of the tool shank and the pipe axis is less critical when the pipe has a diameter of less than 2 inches than it is if the pipe has a diameter of 2 inches or more.

SUMMARY OF THE INVENTION

The pipe end burnishing tool for removing burrs and sharp surfaces from the ends of pipes includes a tool shank. The tool shank has an axis of rotation, a first end adapted to be clamped in a drill chuck, and a second end. A spring abutment surface on the tool shank faces axially toward the second end. A stop surface on the second end of the tool surface is normal to the axis of rotation and faces toward the spring abutment surface. A cup member mounted on the tool shank is rotatably driven by the tool shank and axially movable along the axis of rotation. A cup conical burnishing surface faces radially inward and axially toward the second end of the tool shank. An inside member mounted on the shank is rotatably driven by the tool shank and axially moveable along the axis of rotation. An inside burnishing surface faces radially outward and axially away from the first end of the tool shank. A cup spring acts on the spring abutment surface on the tool shank and the cup member and urges the cup member axially toward the second end of the tool shank. An inside member spring acts on the inside member and urges the inside member toward the stop surface on the second end of the shank.

Other objects and advantages of the invention will become apparent with reference to the accompanying drawings and the accompanying descriptive matter.

BRIEF DESCRIPTION OF THE DRAWINGS

The presently preferred embodiment of the invention is disclosed in the following description and in the accompanying drawings, wherein:

FIG. 3 is a perspective view of the pipe end burnishing tool;

FIG. 4 is an expanded perspective view of the burnishing tool; and

DESCRIPTION OF THE PREFERRED EMBODIMENT

Figure 1:
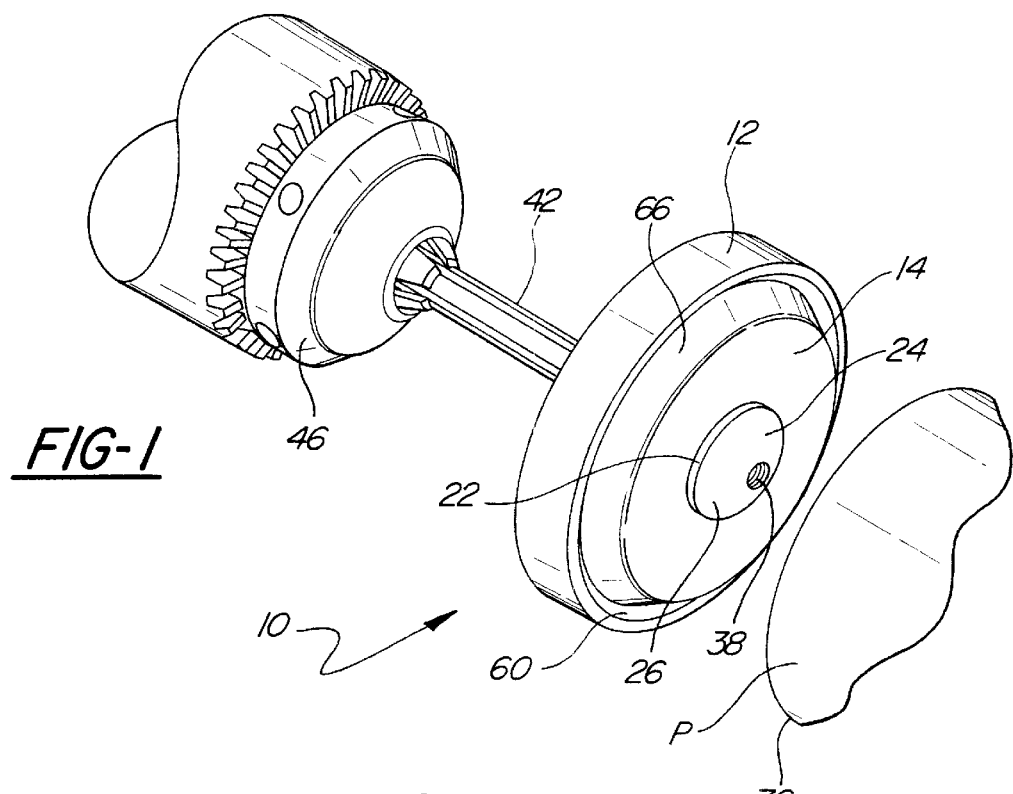
FIG. 1 is a perspective view of the pipe end burnishing tool mounted in a drill chuck and adjacent to a cup end of a pipe with portions broken away.
Figure 2:
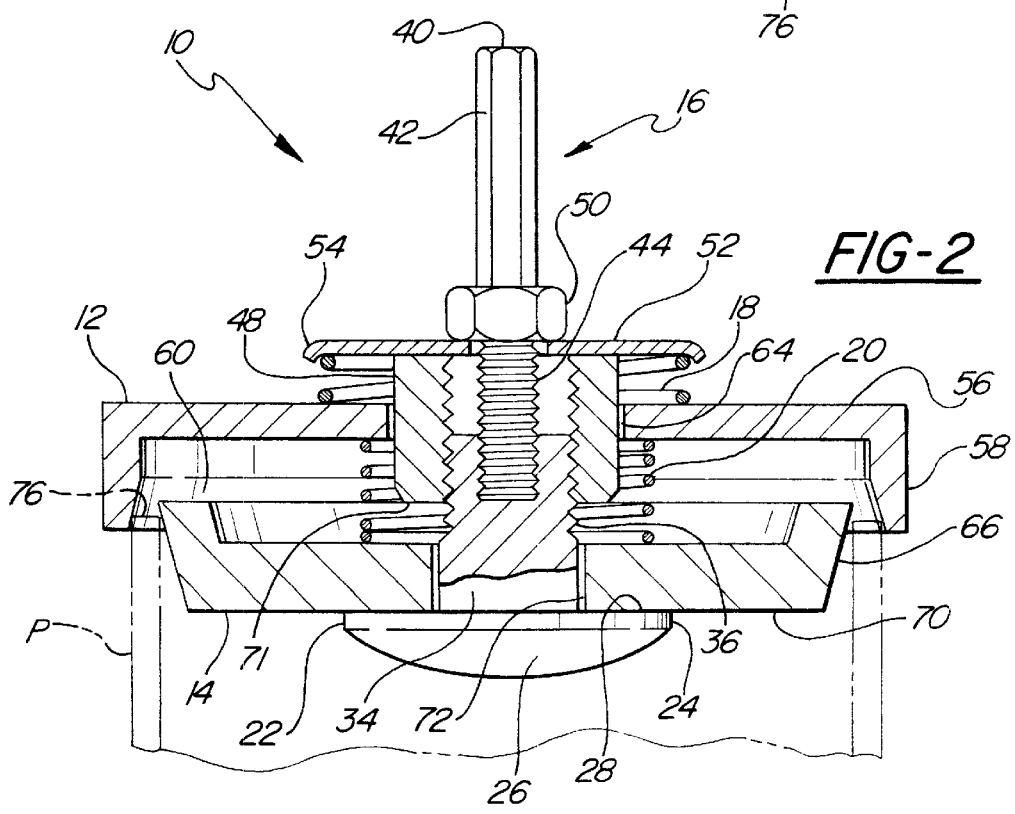
FIG. 2 is an enlarged vertical sectional view of the burnishing tool and a pipe end shown in phantom lines.

The pipe end burnishing tool 10 has a cup member 12, and inside member 14, a shank assembly 16, a cup member compression coil spring 18, and an inside member compression spring 20. The shank assembly 16 includes a carriage bolt 22. The carriage bolt 22 has a head 24 with a spherical surface 26 that faces downward and has a flat upper surface 28 that is normal to the shank assembly axis 30. The carriage bolt 22 has a bolt shank 32 with a four sided square portion 34 adjacent to the flat surface 28, and a threaded end 36. A threaded bore 38, that is coaxial with the shank assembly axis 30, is provided in the upper end of the bolt shank 32. The threaded bore 38 can extend partway through the carriage bolt 22 as shown in FIG. 2 or all the way through as shown in FIG. 1.

A tool shank 40 with a hexagon shaped upper portion 42 and a threaded lower portion 44 screws into the threaded bore 38 in the carriage bolt 22. The hexagon shaped upper portion 42 is received in a drill chuck 46 during use of the burnishing tool 10. A large hexagon nut 48 screws onto the upper end 36 of the carriage bolt 22. A small hexagon nut 50 screws onto the threaded lower portion 44. A spring abutment plate 52 is clamped to the shank assembly 16 between the large nut 48 and the small nut 50 as shown in FIG. 2. A spring retainer flange 54 is provided on the radially outer edge of the spring abutment plate 52.

The cup member 12 has a plate portion 56 and a cylindrical rim portion 58 that extends downward from the outer periphery of the plate portion. An outside burnishing surface 60 is on the inside of the cylindrical rim portion 58. The burnishing surface 60 is a truncated conical surface that is generally coaxial with the axis 30 of the tool shank 40. The burnishing surface 60 on the cup member 12 faces radially inward toward the shank assembly axis 30 and axially downward as shown in FIG. 2. A hexagon shaped aperture 62 in the center of the plate portion 56 telescopically receives the large hexagon nut 48. Driving torque transmitted from the drill chuck 46 to the tool shank 40 is transmitted from the tool shank to the cup member 12 through the large hexagon nut 48. The cup member 12 can move axially relative to the large nut 48. The hexagon shaped aperture 62 is a little larger than the large nut 48 as indicated by the spaces 64 in FIG. 2. This space permits the axis of the burnishing surface 60 in the plate portion 56 to shift slightly out of their normal alignment with the shank assembly axis 30.

The inside member 14 has an inside burnishing surface 66 that faces radially outward and axially downward. The inside burnishing surface 66 is a truncated conical surface. A square aperture 68 in the inside member 14 is concentric with the axis of the inside burnishing surface 66. A bottom surface 70 on the inside member 14 contacts the flat upper surface 28 of the carriage bolt 22 to limit axial movement in one direction. A stop surface 71 on the large nut 48 of the shank assembly 16 limits axial movement of the inside member 14 away from the flat stop surface 28. The four sided square portion 34 of the bolt shank 32 is received in the square aperture 68. The aperture 68 is somewhat larger than the square portion 34 of the carriage bolt as indicated by the spaces 72 in FIG. 2. The spaces 72 permit one side of the inside member 14 to lift up off the upper surface 28 of the carriage bolt while the other side of the inside member is in contact with the flat upper surface. Torque is transmitted from the tool shank 40 to the square portion 34 to the inside member 14 when the shank assembly 16 is driven by the drill chuck 46.

The cup member coil spring 18 acts on the spring abutment plate 52 and the plate portion 56 of the cup member 12 and urges the cup member downward away from the spring abutment plate. An inside member compression spring 20 acts on the inside member 14 and the plate portion 56 of the cup member 12. The inside member 14 is urged toward the upper surface 28 of the carriage bolt 22 and the cup member 12 is urged toward the spring abutment plate 52 by the compression spring 20. The compression coil spring 18 is a stiffer spring than the inside member compression spring 20. As a result of the difference in the stiffness, or spring rates, the cup member coil spring 18 substantially controls position of the cup member 12 when the tool is not in use.

During use of the pipe end burnishing tool 10, a drill, with a drill chuck and the burnishing tool 10 is advanced toward the end 76 of a pipe p. As shown in FIG. 2, the burnishing surfaces 60 and 66 will both contact the pipe end 76 substantially simultaneously. Most of the time, one burnishing surface 60 or 66 will make contact first. The spring 18 or the spring 20 permits the burnishing surface 60 or 66 which was contacted first to move axially along the axis 30 until both burnishing surfaces contact the pipe end 76 and can simultaneously burnish inside and outside surfaces. The axial force exerted on the pipe P by the burnishing surface 66 during burnishing is equal to the force exerted on the inside member 14 by the inside member compression spring 20. The axial force exerted on the pipe P by the burnishing surface 60 is the force exerted on the cup member 12 by the spring 18 minus the force exerted on the cup member by the inside member spring 20. Friction may change the actual forces on the pipe P. However, friction forces should not be significant.

Alignment between the shank assembly axis 30 and the end surface 76 of the pipe P will vary from ideal when using a hand drill. Ideally the end 76 of the pipe P should be normal to the pipe axis and the shank assembly axis 30 should be coaxial with the pipe axis. The loose fit between the cup member 12 and the shank assembly 16 and between the inside member 14 and the shank assembly permit the outside burnishing surface 60 and the inside burnishing surface 66 to move into or toward alignment with the end surface 76 of the pipe P and properly burnish the end of the pipe.

Permitting the cup member 12 and the outside burnishing surface 60 as well as the inside member 14 and the burnishing surface 66 to both move axially and angularly relative to the shank assembly 16 substantially eliminated the tendency of a pipe to lock to the burnishing tool 10 and to rotate with the tool.

Figure 5:
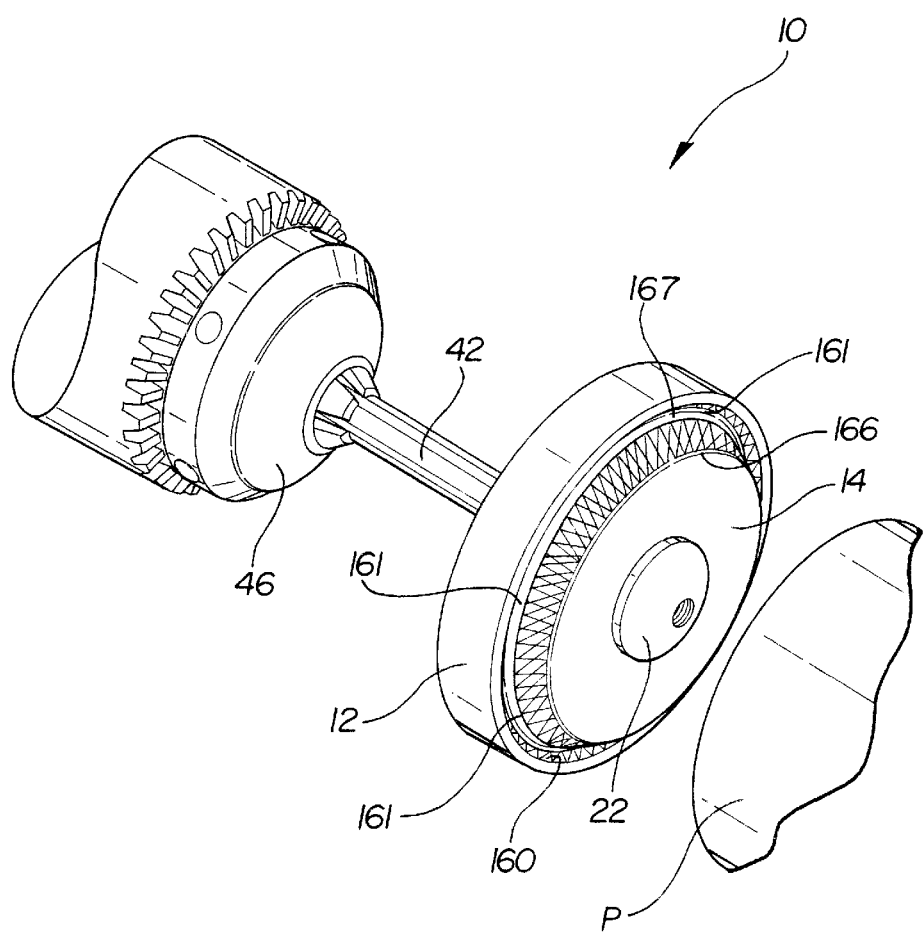
FIG. 5 is a perspective view of the burnishing tool with knurled conical surfaces.

The burnishing surfaces 60 and 66 as shown in FIGS. 1 and 2 are smooth conical surfaces that are hardened. A hardness of Rockwell 62 is satisfactory. These surfaces work well on some pipes. Pipes made from hard materials such as steel require excessive time to adequately burnish. The time required to burnish pipes made from relatively hard materials can be reduced by knurling the burnishing surfaces 160 and 166. The burnishing surfaces 60 and 66 shown in FIG. 5 are knurled. A standard knurled surface has sharp radially extending edges that are too aggressive. To produce a less aggressive surface, the sharp edges were removed by a machining operation to produce what can be referred to a female knurl. The burnishing surfaces 60 and 66 were then hardened by heat treating. The female knurls work well on relatively hard pipe end surfaces and can be used on pipes made from softer materials such as copper or aluminum. The conical surfaces 160 and 166 include smooth surface bands 161 and 167 on their edges that closest to the upper end of the tool shank 40. These bands 161 and 167 reduce the rate of material removal from the pipe end 76 after burrs and sharp edges have been removed.

The disclosed embodiment is representative of a presently preferred form of the invention, but is intended to be illustrative rather than definitive thereof. The invention is defined in the claims.

We claim:

1. A pipe end burnishing tool for removing burrs and sharp surfaces from the ends of pipes comprising:

a tool shank having an axis of rotation, a first end adapted to be clamped in a drill chuck, a second end, a spring abutment surface on the tool shank facing axially toward the second end, a stop surface on the second end of the tool shank that is normal to the axis of rotation and faces toward the spring abutment surface;

a cup member mounted on the tool shank, rotatably driven by the tool shank, axially moveable along the axis of rotation, and having a cup conical burnishing surface that faces radially inward and axially toward the second end of the tool shank;

an inside member mounted on the tool shank, rotatably driven by the tool shank, axially movable relative to the tool shank along the axis of rotation, and having an inside burnishing surface that faces radially outward and axially away from the first end of the tool shank;

a cup spring that acts on the spring abutment surface on the tool shank and on said cup member and urges said cup member axially toward the second end of the tool shank; and an inside member spring that acts on said inside member and urges said inside member toward the stop surface on the second end of the tool shank.

2. A pipe end burnishing tool, as set forth in claim 1, wherein the inside member spring also acts on said cup member and urges said cup member axially toward the first end of the tool shank.

3. A pipe end burnishing tool, as set forth in claim 2, wherein the cup spring has a higher spring rate than the inside member spring.

4. A pipe end burnishing tool, as set forth in claim 1 including a second inside member stop that limits axial movement of said inside member toward the first end of the tool shank.

5. A pipe end burnishing tool, as set forth in claim 1, wherein the cup member is free to tilt a limited amount about a plurality of cup axes normal to the axis of rotation to align the cup conical burnishing surface with pipe ends; and the inside member is free to tilt a limited amount about a plurality of inside member axes normal to the axis of rotation to align the inside burnishing surface with pipe ends.

6. A pipe end burnishing tool, as set forth in claim 1 wherein the cup conical burnishing surface and the inside burnishing surface are knurled.

7. A pipe end burnishing tool, as set forth in claim 1, wherein the cup conical burnishing surface and the inside burnishing surface are both a female knurled surface.

8. A pipe end burnishing tool for removing burrs and sharp surfaces form the ends of pipes comprising:
- a tool shank having an axis of rotation, a first end adapted to be clamped in a drill chuck, a second end, a spring abutment secured to the tool shank, a flat stop surface on the second end of the tool shank that is normal to the axis of rotation and faces toward the spring abutment;
- a cup member mounted on the tool shank, rotatably driven by the tool shank, free to tilt a limited amount about a plurality of cup axes that are normal to the axis of rotation, axially movable along the axis of rotation, and having a cup conical burnishing surface that faces radially inward and axially toward the second end of the tool shank;
- an inside member mounted on the tool shank, rotatably driven by the tool shank, free to tilt a limited amount about a plurality of inside member axes that are normal to the axis of rotation, and having an inside burnishing surface that faces radially outward and axially away from the first end of the tool shank;
- a cup spring that acts on the spring abutment secured to the tool shank and said cup member and urges said cup member axially toward the second end of the tool shank; and
- an inside member spring that acts on said cup member and said inside member, urges said cup member toward the first end of the tool shank, and urges said inside member away from the first end of the tool shank.

9. A pipe end burnishing tool as set forth in claim 8 wherein the cup spring has a higher spring rate than the inside spring member.

10. A pipe end burnishing tool, as set forth in claim 8, wherein the tool shank has a second inside member stop that limits axial movement of said inside member toward the first end of the tool shank.

11. A pipe end burnishing tool, as set forth in claim 8, wherein the cup conical burnishing surface and the inside burnishing surface are knurled.

12. A pipe end burnishing tool, as set forth in claim 8, wherein the cup conical burnishing surface and the inside burnishing surface are both a female knurled surface.

13. A pipe end burnishing tool for removing burrs and sharp surfaces from the ends of pipes comprising:
- a tool shank having an axis of rotation, a first end adapted to be clamped in a drill chuck, a second end, a spring abutment surface on the tool shank facing axially toward the second end, a stop surface on the second end of the tool shank that is normal to the axis of rotation and faces toward the spring abutment surface;
- a cup member mounted on the tool shank, rotatably driven by the tool shank, axially moveable along the axis of the rotation, and having a cup conical burnishing surface that faces radially inward and axially toward the second end of the tool shank;
- an inside member mounted on the tool shank, rotatably driven by the tool shank, axially movable along the axis of rotation, and having an inside burnishing surface that faces radially outward and axially away from the first end of the tool shank;
- a cup spring that acts on the spring abutment surface on the tool shank and on said cup member and urges said cup member axially toward the second end of the tool shank;
- an inside member spring that acts on said inside member and urges said inside member toward the stop surface on the second end of the tool shank; and
- wherein the inside member spring also acts on said cup member and urges said cup member axially toward the first end of the tool shank.

14. A pipe end burnishing tool, as set forth in claim 13, wherein the cup spring has a higher spring rate than the inside member spring.

15. A pipe end burnishing tool, as set forth in claim 13 including a second inside member stop that limits axial movement of said inside member toward the first end of the tool shank.

16. A pipe end burnishing tool, as set forth in claim 13, wherein the cup member is free to tilt a limited amount about a plurality of cup axes normal to the axis of rotation to align the cup conical burnishing surface with pipe ends; and the inside member is free to tilt a limited amount about a plurality of inside member axes normal to the axis of rotation to align the inside burnishing surface with pipe ends.

17. A pipe end burnishing tool for removing burrs and sharp surfaces from the ends of pipes comprising:
- a tool shank having an axis of rotation, a first end adapted to be clamped in a drill chuck, a second end, a spring abutment surface on the tool shank facing axially toward the second end, a stop surface on the second end of the tool shank that is normal to the axis of rotation and faces toward the spring abutment surface;
- a cup member mounted on the tool shank, rotatably driven by the tool shank, axially moveable along the axis of the rotation, and having a cup conical burnishing surface that faces radially inward and axially toward the second end of the tool shank;
- an inside member mounted on the tool shank, rotatably driven by the tool shank, axially movable along the axis of rotation, and having an inside burnishing surface that faces radially outward and axially away from the first end of the tool shank;
- a cup spring that acts on the spring abutment surface on the tool shank and on said cup member and urges said cup member axially toward the second end of the tool shank;

an inside member spring that acts on said inside member and urges said inside member toward the stop surface on the second end of the tool shank; and wherein the cup conical burnishing surface and the inside burnishing surface are knurled.

18. A pipe end burnishing tool for removing burrs and sharp surfaces from the ends of pipes comprising:

a tool shank having an axis of rotation, a first end adapted to be clamped in a drill chuck, a second end, a spring abutment surface on the tool shank facing axially toward the second end, a stop surface on the second end of the tool shank that is normal to the axis of rotation and faces toward the spring abutment surface;

a cup member mounted on the tool shank, rotatably driven by the tool shank, axially moveable along the axis of the rotation, and having a cup conical burnishing surface that faces radially inward and axially toward the second end of the tool shank;

an inside member mounted on the tool shank, rotatably driven by the tool shank, axially movable along the axis of rotation, and having an inside burnishing surface that faces radially outward and axially away from the first end of the tool shank;

a cup spring that acts on the spring abutment surface on the tool shank and on said cup member and urges said cup member axially toward the second end of the tool shank;

an inside member spring that acts on said inside member and urges said inside member toward the stop surface on the second end of the tool shank; and wherein the cup conical burnishing surface and the inside burnishing surface are both a female knurled surface.

* * * * *

UNITED STATES PATENT AND TRADEMARK OFFICE
CERTIFICATE OF CORRECTION

PATENT NO. : 6,497,022 B1
DATED : December 24, 2002
INVENTOR(S) : Sam W. Carter

It is certified that error appears in the above-identified patent and that said Letters Patent is hereby corrected as shown below:

Title page,
Item [54], should read as follows: -- PIPE END BURNISHING TOOL WITH FLOATING SURFACES. --

Signed and Sealed this

Seventeenth Day of June, 2003

JAMES E. ROGAN
*Director of the United States Patent and Trademark Office*